US008872498B2

(12) United States Patent
Goetzenberger et al.

(10) Patent No.: US 8,872,498 B2
(45) Date of Patent: Oct. 28, 2014

(54) DC CONVERTER FOR A MOTOR VEHICLE

(75) Inventors: Martin Goetzenberger, Ingolstadt (DE); Sven Sylla, Regenstauf (DE)

(73) Assignee: Continental Automotive GmbH, Hannover (DE)

( * ) Notice: Subject to any disclaimer, the term of this patent is extended or adjusted under 35 U.S.C. 154(b) by 613 days.

(21) Appl. No.: 13/145,815

(22) PCT Filed: Jan. 18, 2010

(86) PCT No.: PCT/EP2010/050508
§ 371 (c)(1),
(2), (4) Date: Jul. 22, 2011

(87) PCT Pub. No.: WO2010/084093
PCT Pub. Date: Jul. 29, 2010

(65) Prior Publication Data
US 2011/0279104 A1 Nov. 17, 2011

(30) Foreign Application Priority Data
Jan. 22, 2009 (DE) .......................... 10 2009 005 615

(51) Int. Cl.
*G05F 5/00* (2006.01)
*H02M 3/158* (2006.01)
(52) U.S. Cl.
CPC .................................. *H02M 3/1582* (2013.01)
USPC ....................................................... 323/299
(58) Field of Classification Search
CPC ........... G05F 1/24; G05F 1/26; H02M 3/1582
USPC .................. 323/222, 225, 268, 271, 282, 299
See application file for complete search history.

(56) References Cited

U.S. PATENT DOCUMENTS

| 4,536,700 | A | 8/1985 | Bello et al. |
| 5,691,269 | A | 11/1997 | Rizkalla |
| 5,691,629 | A | 11/1997 | Belnap |
| 5,942,818 | A * | 8/1999 | Satoh et al. ...................... 310/46 |
| 5,982,156 | A | 11/1999 | Weimer et al. |
| 6,246,467 | B1 * | 6/2001 | Yoshida ........................ 356/3.01 |
| 6,469,476 | B1 * | 10/2002 | Barrett et al. .................... 322/29 |
| 6,798,177 | B1 | 9/2004 | Liu et al. |
| 2001/0023488 | A1 | 9/2001 | Breunig et al. |
| 2005/0156658 | A1 | 7/2005 | Ikezawa |
| 2007/0085523 | A1 | 4/2007 | Scoones et al. |
| 2008/0157732 | A1 | 7/2008 | Williams |

FOREIGN PATENT DOCUMENTS

| DE | 3531970 A1 | 3/1987 |
| DE | 102005015992 A1 | 10/2006 |

* cited by examiner

*Primary Examiner* — Matthew Nguyen
(74) *Attorney, Agent, or Firm* — Laurence A. Greenberg; Werner H. Stemer; Ralph E. Locher

(57) ABSTRACT

A step-up converter converts a battery voltage to an intermediate voltage. The intermediate voltage is greater than or equal to the battery voltage. A step-down converter receives the intermediate voltage supplied by the step-up converter and controls an output voltage which is less than or equal to the intermediate voltage. The step-up converter controls the intermediate voltage in an open loop depending on the battery voltage, at least if the battery voltage is lower than a first predetermined value, and at least if at the same time the load on the output of the step-up converter exceeds a minimum load.

13 Claims, 3 Drawing Sheets

DC CONVERTER FOR A MOTOR VEHICLE

BACKGROUND OF THE INVENTION

Field of the Invention

The invention relates to a DC/DC voltage converter for a motor vehicle. Step-down converters, which are intended to provide a constant voltage of, for example, 5 V are used to operate electrical appliances in motor vehicles even when the battery voltage is fluctuating. If the battery voltage falls below 5 V when starting the engine, the step-down converter can no longer maintain an output voltage of 5 V, as a result of which appliances which are supplied from the step-down converter will fail.

U.S. Pat. No. 5,691,269 and U.S. Pat. No. 6,798,117 B1 disclose so-called boost-buck cascades, in which a step-up converter converts an input voltage to an intermediate voltage, and a step-down converter converts this intermediate voltage to an output voltage. A step-up converter can correspondingly be connected between the battery and the step-down converter, in order to provide an intermediate voltage of more than 5 V for the input of the step-down converter.

However, in this case, it is particularly difficult to keep the series-connected step-up converter and step-down converter stable. This is particularly complex when an electromagnetic compatibility filter (EMC filter) is additionally provided.

BRIEF SUMMARY OF THE INVENTION

One object of the invention is to provide a DC/DC voltage converter which makes it possible to provide a stable output voltage even with different battery voltages.

According to the invention, a DC/DC voltage converter is provided for a motor vehicle having a battery which provides a battery voltage. DC/DC voltage converters are also referred to as DC/DC converters. The DC/DC voltage converter contains a step-up converter and a step-down converter. The step-up converter is provided to convert the battery voltage to an intermediate voltage. The intermediate voltage is greater than or equal to the battery voltage. The step-down converter is provided to receive the intermediate voltage, which is output from the step-up converter, and to regulate an output voltage which is less than or equal to the intermediate voltage. The step-up converter controls the intermediate voltage, at least in one operating mode, in an open control loop, as a function of the battery voltage, at a value which is not equal to the battery voltage.

The apparatus has the advantage that the intermediate voltage need not be regulated. There is no need to feed the intermediate voltage back into a control loop. In order to comply with a requirement to achieve a specific minimum voltage at the output, it is sufficient to provide open-loop control for the step-up converter without closed-loop control of the intermediate voltage solely as a function of the input voltage, that is to say the battery voltage. Without such closed-loop control or regulation, the step-up converter cannot become unstable. The DC/DC voltage regulator can thus be kept stable with relatively little circuit complexity, without having to accept a large amount of simulation and design effort. In consequence, the DC/DC voltage converter can be kept stable over wide operating ranges.

In one embodiment, this operating mode is characterized in that the battery voltage is less than a first predetermined value and in that, at the same time, the load which is connected to the output of the step-up converter exceeds a minimum load.

By way of example, in the case of a battery voltage of 13.5 V, a voltage of 8 V is chosen as the first predetermined value and a current of 10 microamperes is chosen as the minimum load, in one embodiment. A power of 50 microwatts, for example, can also be chosen as the minimum load.

In the operating modes in which the battery voltage is greater than the first predetermined value or the load is less than the minimum load, the intermediate voltage may be provided differently in some embodiments, thus simplifying the design of the open-loop control.

If the step-up converter has a switch which is open completely when the battery voltage is greater than the predetermined value, complete opening of the switch ensures that the intermediate voltage is substantially the same as the battery voltage. The step-up converter therefore does not need to be actively operated when the battery voltages are high. This measure reduces the power consumption.

In one embodiment, the step-up converter has a switch and a control circuit for the switch, which control circuit controls the switch with a pulse-width-modulated signal. The energy provided by the step-up converter can be set precisely with the aid of the pulse-width-modulated signal.

If the duty ratio of the pulse-width-modulated signal increases as the battery voltage rises, account is taken of the fact that the current through the step-up converter should be correspondingly increased when the battery voltage is relatively low.

In one preferred embodiment, the control circuit is set such that a predetermined duty ratio which is less than 100%, is not exceeded at the minimum battery voltage. By way of example, the minimum battery voltage may be fixed at 0 V, and the predetermined duty ratio at 80%. Setting the duty ratio in this way ensures that reserves are still available to increase the duty ratio when the battery voltages are low.

The DC/DC voltage converter is particularly suitable if an EMI filter (electromagnetic interference filter) is connected between one connection of the battery and one input of the step-up converter. An EMI filter influences the transfer function of the system for providing the output voltage. In the case of a regulated step-up converter, regulated step-down converter and EMI filter, it is particularly difficult to set the stability.

In one embodiment, the control circuit has a subtractor for subtraction of the battery voltage from a predetermined voltage, and a comparator for setting the duty ratio such that the duty ratio is proportional to the signal which is output from the subtractor.

If the comparator is designed to compare the output signal from the subtractor with a reference voltage which has a triangular profile, the comparator will provide, at its output, a pulse-width-modulated signal which is inversely proportional to the battery voltage and which can directly control the switch for the step-up converter.

The intermediate voltage is preferably set such that it is substantially constant in a battery voltage range which extends from a predetermined minimum value to a nominal battery voltage. The step-down converter therefore produces substantially the same voltage at its input, and it can be optimized for this.

In one embodiment, a diode is provided in order to switch the step-up converter off in the situation when the intermediate voltage exceeds the first predetermined value. This prevents the intermediate voltage from assuming such high values that it can destroy connected circuits when there is a low load on the output of the step-up converter.

The invention also relates to an assembly comprising a DC/DC voltage converter according to the invention and a battery which provides the battery voltage for the step-up converter in the DC/DC voltage converter.

The invention also relates to the use of an assembly such as this in a motor vehicle. The battery voltage falls severely, particularly when starting the engine. The fluctuations which occur in this voltage in this case are difficult to cope with, as a result of which the stability of the DC/DC voltage converter is very important.

The invention also relates to a method for operation of a DC/DC voltage converter according to the invention. In this method, the step-up converter is controlled in an open loop, such that the step-up converter provides the intermediate voltage as a function of the battery voltage. The output voltage is regulated by means of voltage regulation by the step-down converter.

BRIEF DESCRIPTION OF THE SEVERAL VIEWS OF THE DRAWING

The invention will now be explained with reference to the attached figures, in which.

DESCRIPTION OF THE INVENTION

Figure 1:
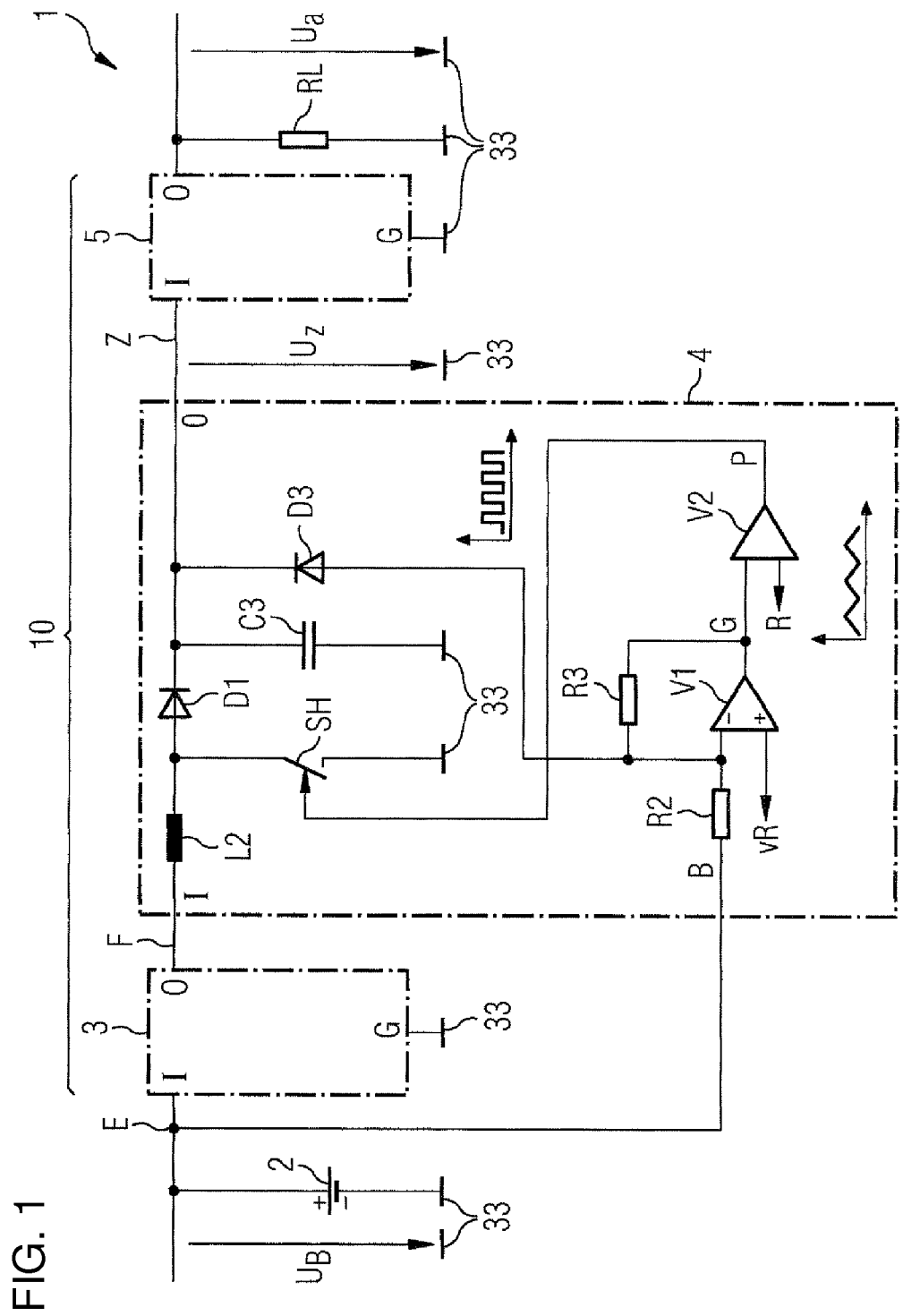
FIG. 1 shows one exemplary embodiment of a DC/DC voltage converter according to the invention.

FIG. 1 shows one exemplary embodiment of a circuit arrangement having a DC/DC voltage converter according to the invention. The circuit arrangement 1 contains a battery 2, an EMI filter (electromagnetic interference filter) 3, a step-up converter 4, a step-down converter 5 and a load, which is represented by a pure resistance RL.

The battery 2 produces a nominal voltage of 13.5 V between its positive pole and its negative pole. The negative pole is connected to ground 33, and the positive pole is connected to a node E. The node E forms an input for the DC/DC voltage converter 10, which contains the EMI filter 3, the step-up converter 4 and the step-down converter 5. The input I of the EMI filter 3 is connected to the node E, while its input G is connected to ground 33. The output O of the EMI filter is connected to the node F.

The step-up converter 4 contains an inductor L2, a switch SH, a first diode D1 and a first capacitor C3. A first connection of the inductor L2 is connected to the node F, while its second connection is connected to the anode of the first diode D1 and to a first connection of the load path of the switch SH. The second connection of the load path of the switch SH is connected to ground 33. When the switch is closed, a current flows between the two connections of the load path of the switch SH, while the current flow between the two connections of the load path is interrupted when the switch SH is open. By way of example, the switch SH is an n-channel MOSFET. In this case, the first connection of the load path is the drain, the second connection of the load path is the source, and the control connection of the switch SH is the gate.

The cathode of the first diode D1 is connected to a first plate of the capacitor C3, whose second plate is connected to ground 33. The cathode of the first diode D1 is furthermore connected to an output O of the step-up converter 4, which is connected to the intermediate node Z.

Furthermore, the step-up converter 4 contains an operational amplifier V1, a comparator V2, a first resistor R2, a second resistor R3 and a second diode D3. A first connection of the first resistor R2 is connected to the input B of the step-up converter 4, which is connected to the node E. The second connection of the first resistor R2 is connected to the inverting input of the operational amplifier V1, to a first connection of the second resistor R3 and to the anode of the second diode D3.

The second connection of the second resistor R3 is connected to the output of the first operational amplifier V1 via the connecting node G. The non-inverting input of the operational amplifier V1 is connected to a node which is fed from a reference voltage source, thus resulting in a first constant reference voltage vR between this node and ground 33.

The node G is also connected to a first input of the comparator V2, to whose second input a second reference voltage R is applied. The reference voltage R has a triangular profile, whose minimum value is, however, greater than 0 V. The output of the comparator V2 is connected to the node P, to which the control input of the switch SH is connected.

The step-down converter 5 has a first input I, a second input G and an output O. The first input I is connected to the intermediate node Z, the input G is connected to ground 33, and the output O is connected to a first connection of the load resistance RL. The second connection of the load resistance RL is connected to ground 33.

The battery 2 is coupled to the input I of the step-up converter 4 via the node 4 and the EMI filter 3. The voltage at the input I is substantially the same as that at the node E, but radio-frequency signal components, which could adversely affect the electromagnetic compatibility of the circuit arrangement 1, are filtered out.

If the switch SH is alternately opened and closed, an output voltage which is higher than the battery voltage is produced between the intermediate node Z and ground 33. When the switch SH is closed, the battery voltage is essentially applied via the inductor L2. The current through the coil rises, as a result of which the energy stored in the inductor L2 also rises.

If the switch SH is now opened, then the inductor L2 attempts to maintain the current flow, as a result of which the potential at the second connection of the inductor L2 rises. The first diode D1 thus becomes forward-biased, and the current flows through the first diode D1 into the capacitor C3, which is therefore charged.

The switch SH is controlled by the control circuit which is formed from the operational amplifier V1, the comparator V2 and the two resistors R2 and R3. 12 V is applied to the non-inverting input of the operational amplifier V1, as the first reference voltage vR. The operational amplifier V1 together with the resistors R2 and R3 forms a subtractor, which subtracts the voltage at the inverting input from the voltage at the non-inverting input. The operational amplifier V1 and the R2/R3 reference therefore convert the battery voltage such that a voltage which is inversely proportional to the battery voltage is produced at the node G. The transfer function is in this case set by the resistors R3 and R2.

The comparator V2 compares the voltage at the node G with the second reference voltage R, also called a ramp voltage R. A pulse-width-modulated signal, which controls the switch SH, is produced at the output of the comparator V2. The energy passed to the output O of the step-up converter is set in this way. The higher the duty ratio of the pulse-width-modulated signal, the greater is the amount of energy flowing from the input to the output, while the energy falls when the duty ratio is lower. The duty ratio is the ratio between the time during which the switch SH is closed and the time during which the switch SH is open. The duty ratio is preferably quoted as a percentage.

With a continuous inductor current and ideal components, the theoretical relationship $U_Z=U_F/(1-dc)$ applies. In this case, $U_Z$ is the voltage between the intermediate node Z and ground 33, $U_F$ is the voltage between the node F and ground 33, and dc is the duty ratio of the switch SH. However, in this case, it must be remembered that a specific minimum current must flow through the load. Above this specific minimum current, the output voltage $U_Z$ of the step-up converter 4 rises in proportion to the duty ratio.

In the illustrated example, the gain of the operational amplifier V1 was chosen such that the switch SH remains permanently open when the battery voltage is greater than a first predetermined value of 8 V. The output voltage $U_Z$ is therefore equal to the battery voltage, assuming ideal components. The output voltage is therefore sufficiently high to ensure reliable operation of the step-down converter 5.

If the battery voltage falls below 8 V, then there is a pulse-width-modulated signal at the node P, whose duty ratio dc rises as the battery voltage falls further. The ratio of the resistors R2 and R3 is chosen such that the voltage $U_Z$ is as constant as possible in this operating range. With theoretically ideal components, the output voltage $U_Z$ from the step-up converter 4 can theoretically be kept constant above a specific minimum load.

If a specific minimum load is undershot, the power consumed by the step-down converter and the load RL is too low, the above mathematical relationship is no longer valid. With a zero load, the output voltage $U_Z$ rises to indefinitely high output voltages. In order to prevent the output voltage $U_Z$ from the step-up converter from exceeding unacceptably high values when there is zero load on the output, the second diode D3, which is in the form of a zener diode, is inserted into the circuit.

When the voltage $U_Z$ rises above a predetermined value, the second diode D3 is forward-biased, as a result of which the potential at the non-inverting input of the operational amplifier V1 rises to a major extent. In consequence, the voltage of the node G falls below the minimum value of the ramp voltage R, thus resulting in a duty ratio dc of 0%. The switch SH is opened. The pulse-width-modulated signal is therefore blocked above a specific protection voltage at the intermediate node Z.

It is likewise possible, and in practice also preferable, for the maximum duty ratio of the pulse-width-modulated signal to be limited to sensible values. A duty ratio of 100% would lead to the switch SH being switched on all the time, and would therefore lead to a malfunction. If the minimum input voltage, that is to say the battery voltage, is equal to 4 V, then a duty ratio of about 33% is sufficient in the illustrated exemplary embodiment to produce the minimum voltage required for the step-down converter 5 at the node Z. The minimum value of the input voltage is, for example, 6 V, and is designed such that the step-down converter 5 operates reliably.

Figure 2:
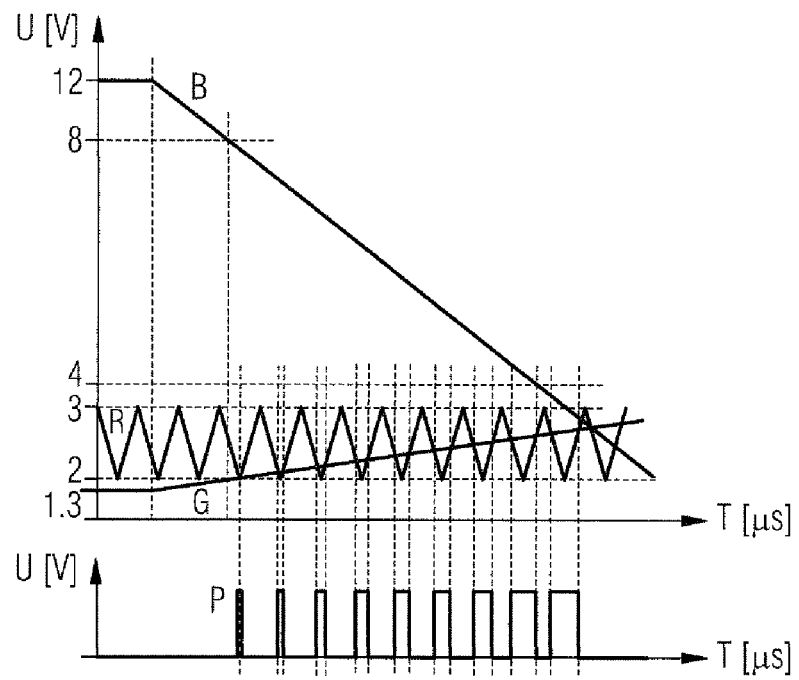
FIG. 2 shows voltage profiles at selected nodes in the DC/DC voltage converter shown in FIG. 1.

FIG. 2 shows the profile of the voltage at the input B over time. This profile is the same as the profile of the battery voltage. Furthermore, FIG. 2 shows the profile of the control voltage at the node G over time, the profile of the ramp voltage at the node R over time, and the profile of the pulse-width-modulated signal at the node P over time. The step-up converter 4 starts to be clocked, that is to say the duty ratio is greater than 0, when the voltage at the node G intersects the ramp voltage at the node R.

The ramp voltage forms a square-wave signal with a maximum value of 3 V and a minimum value of 2 V. If the battery voltage is in the range between 12 V and 8 V, the voltage at the node G is less than 2 V, and is therefore less than the ramp voltage. If the battery voltage falls below 8 V, then the voltage at the node G intersects the ramp voltage, as a result of which the duty ratio becomes greater than zero. The further the battery voltage $U_Z$ falls, the greater is the duty ratio of the pulse-width-modulated signal at the node P. The step-up converter 4 counteracts the falling battery voltage by increasing the duty ratio.

As shown, the step-up converter 4 is subject to open-loop control, rather than closed-loop control. This applies at least to the range in which the battery voltage undershoots a predetermined value of 8 V, and a minimum current flows at the output O of the step-up converter 4. In this case, it is sufficient for open-loop control to be provided for the step-up converter 4 solely as a function of the battery voltage, without the output voltage $U_Z$ being fed back in a closed control loop. The step-up converter 4 cannot be destabilized without closed-loop control or regulation. In the majority of cases, this open-loop control results in the value of the intermediate voltage not being the same as the battery voltage.

Figure 3:
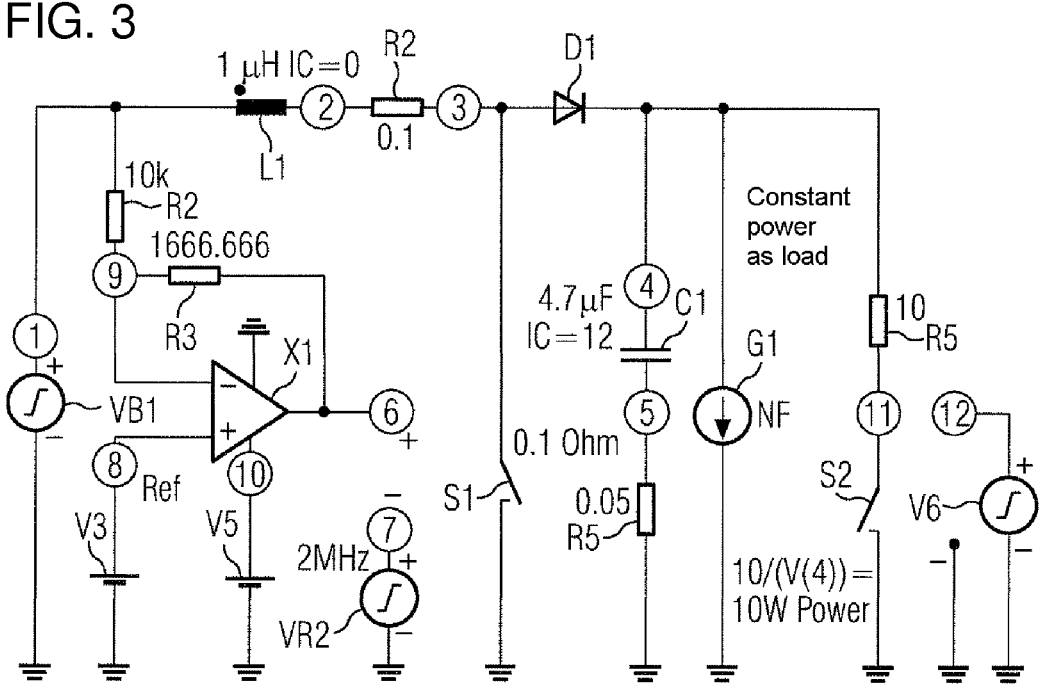
FIG. 3 shows a simulation circuit diagram for a DC/DC voltage converter according to the invention.

FIG. 3 shows the circuit for simulation of the output voltage $U_Z$ of the controlled step-up converter 4 when a specific pulse, which simulates the engine starting process, is applied. In addition, periodic load changes have been superimposed on the output voltage $U_Z$, in order to check the response of the output voltage without an output variable being fed back, that is to say without closed-loop control.

The voltage source VB1 is the input voltage for the step-up converter. The circuit R2/R3/X1/V3 carries out the described pilot control. In this case, X1 is the operational amplifier, and the voltage source V 82 provides the first reference voltage VR. In this case, the node G is annotated as the node 6. The voltage source V5 produces the supply voltage for the operational amplifier X1. The voltage supply VR2 produces a periodic triangular-waveform voltage, between 2 and 3 V and at a frequency of 2 MHz, between ground 33 and the node 7.

The switch S1 is switched on when the voltage between the nodes 6 and 7 has exceeded 10 mV. If the voltage at the node 6 exceeds the instantaneous value of the triangular-waveform voltage at the node 7 plus 10 mV, then the switch S1 is closed. The inductor L2 from FIG. 1 is represented by an inductance L1 and a resistance R1 connected in series. The capacitor C3 from FIG. 1 is represented by a capacitor C1 and a resistance R5, which a connected in series.

The load contains the constant load G1 and a variable load, which is formed by the resistance R5 and the switch S1. The constant load G1 is a power sink, which applies a load of 10 W to the step-up converter 5. The switch S2 periodically connects the load resistance R5 to the output of the step-up converter 4, every 100 μs.

Figure 4:
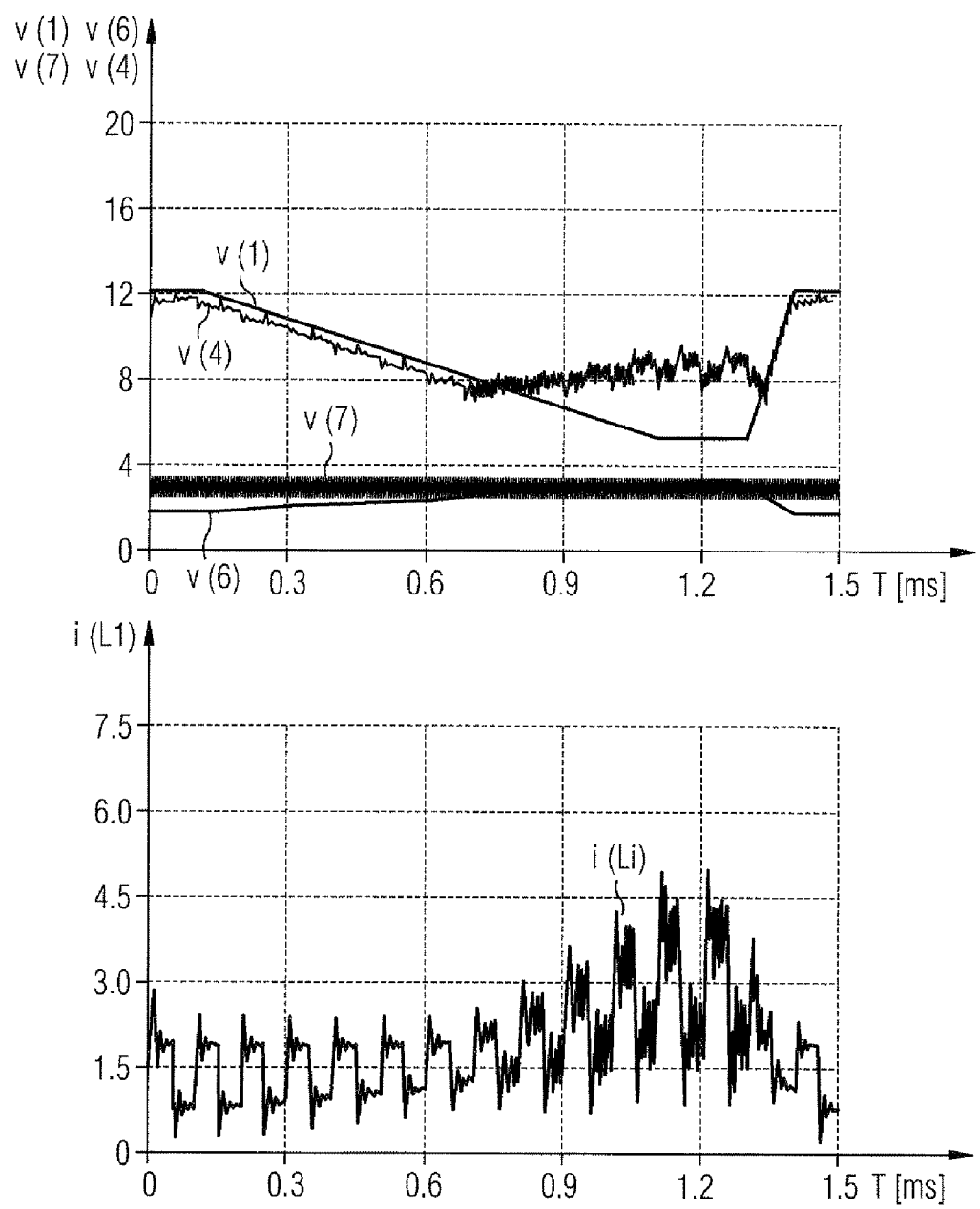
FIG. 4 shows simulated voltage profiles of the DC/DC voltage converter shown in FIG. 3.

FIG. 4 shows simulated voltage profiles and current profiles at selected nodes in the DC/DC voltage converter as shown in FIG. 3. The voltages are shown against time in the upper diagram. The voltages are each referred to ground 33. The curve v(1) shows the battery voltage, which falls from 12 V to about 5 V during an engine starting process. The associated voltage at the step-up converter output, that is to say at the node Z, is represented by the curve v(4). As can be seen, the output voltage from the step-up converter 4 first of all falls to below 8 V with the battery voltage, but then rises above the battery voltage. As can be seen, the curve v(4), and therefore the output voltage of the step-up converter does not fall below 7.5 V. A downstream step-down converter can thus maintain 5 V at its output. The load-change reaction can clearly be seen. The curve v(4) shows clear, but non-problematic resonances during the load change. The curve v(6) shows the output voltage of the operational amplifier X1. The curve v(7) shows the ramp voltage at the node 6.

The profile of the inductor current I(L1) is shown against time in the lower diagram. As described above, the inductor current is necessarily continuous, that is to say it is always greater than zero. The resonances can clearly be seen. Since the step-up converter 4 has no closed-loop control, the resonances can be seen at the output of the step-up converter 4. These resonances are damped, and the magnitude of the oscillations is governed by the losses in the filter components in the step-up converter 4 and the gradient of the load change current rise.

If there is an upstream EMC filter, the resonances can be amplified, depending on the filter Q-factor of the EMC filter. In practice, the power supply can be designed such that the lowest resonance oscillation points do not fall below the minimum voltage of the downstream step-down converter 5, and the control bandwidth of the step-down converter is sufficient to adequately damp these voltage fluctuations at the output. Once designed, there is no need to be concerned about resonance voltages starting to oscillate. The circuit arrangement therefore operates in a stable form.

The invention claimed is:

1. A DC/DC voltage converter for a motor vehicle having a battery providing a battery voltage, the DC/DC voltage converter comprising:
   a step-up converter for converting the battery voltage to an intermediate voltage, with the intermediate voltage being greater than or equal to the battery voltage, said step-up converter configured for open-loop control, at least in one operating mode, of the intermediate voltage in dependence on the battery voltage at a value which is not equal to the battery voltage; and
   a step-down converter for receiving the intermediate voltage output from said step-up converter and for regulating of an output voltage being less than or equal to the intermediate voltage;
   said step-up converter including a switch and a control circuit configured to open and close said switch to step-up said battery voltage when the battery voltage is less than a first predetermined value, and to permanently open said switch when the battery voltage is greater than the first predetermined value.

2. The DC/DC voltage converter according to claim 1, wherein:
   said step-up converter has an output outputting the intermediate voltage; and
   in the at least one operating mode, in which said step-up converter is configured for open-loop control of the intermediate voltage in dependence on the battery voltage, the battery voltage is less than the first predetermined value, and a load which is connected to said output of said step-up converter exceeds a minimum load.

3. The DC/DC voltage converter according to claim 2, wherein said control circuit is configured to control said switch with a pulse-width-modulated signal when the battery voltage is less than the first predetermined value.

4. The DC/DC voltage converter according to claim 3, wherein a duty ratio of the pulse-width-modulated signal increases as the battery voltage rises, at least when the battery voltage is less than the first predetermined value.

5. The DC/DC voltage converter according to claim 4, wherein said control circuit is set such that the duty ratio which is less than 100%, is not exceeded at a minimum battery voltage.

6. The DC/DC voltage converter according to claim 1, wherein said step-up converter has an input; and
   further comprising an electromagnetic interference filter disposed between one connection of the battery and said input of said step-up converter.

7. The DC/DC voltage converter according to claim 3, wherein said control circuit has a subtractor for subtraction of the battery voltage from a reference voltage, and a comparator for setting a duty ratio such that the duty ratio is proportional to a signal which is output from said subtractor.

8. The DC/DC voltage converter according to claim 7, wherein said comparator is configured to compare an output signal from said subtractor with the reference voltage which has a triangular profile.

9. The DC/DC voltage converter according to claim 1, wherein the intermediate voltage is set such that it is substantially constant in a battery voltage range which extends from a predetermined minimum value to a nominal battery voltage.

10. The DC/DC voltage converter according to claim 2, wherein said step-up converter has a diode for switching said step-up converter off in a situation when the intermediate voltage exceeds the first predetermined value.

11. An assembly, comprising:
    a battery outputting a battery voltage; and
    a DC/DC voltage converter connected to said battery, the DC/DC voltage converter having:
      a step-up converter for converting the battery voltage to an intermediate voltage, with the intermediate voltage being greater than or equal to the battery voltage, said step-up converter configured for open-loop control, at least in one operating mode, of the intermediate voltage in dependence on the battery voltage at a value which is not equal to the battery voltage; and
      a step-down converter for receiving the intermediate voltage output from said step-up converter and for regulating of an output voltage being less than or equal to the intermediate voltage;
      said step-up converter including a switch and a control circuit configured to open and close said switch to step-up said battery voltage when the battery voltage is less than a first predetermined value, and to permanently open said switch when the battery voltage is greater than the first predetermined value.

12. An operating method, which comprises the steps of:
    providing an assembly including a battery outputting a battery voltage and a DC/DC voltage converter connected to the battery, the DC/DC voltage converter having a step-up converter for converting the battery voltage to an intermediate voltage, with the intermediate voltage being greater than or equal to the battery voltage, the step-up converter configured for open-loop control, at least in one operating mode, of the intermediate voltage in dependence on the battery voltage at a value which is not equal to the battery voltage, and a step-down converter for receiving the intermediate voltage output from the step-up converter and for regulating of an output voltage being less than or equal to the intermediate voltage, said step-up converter including a switch and a control circuit configured to open and close said switch to step-up said battery voltage when the battery voltage is less than a first predetermined value, and to permanently open said switch when the battery voltage is greater than the first predetermined value; and
    using the assembly in a motor vehicle.

13. A method of operating a DC/DC voltage converter including a step-up converter for converting a battery voltage to an intermediate voltage, with the intermediate voltage being greater than or equal to the battery voltage, the step-up converter configured for open-loop control, at least in one operating mode, of the intermediate voltage in dependence on the battery voltage at a value which is not equal to the battery voltage and a step-down converter for receiving the intermediate voltage output from the step-up converter and for regulating of an output voltage being less than or equal to the intermediate voltage, said step-up converter including a switch and a control circuit configured to open and close said switch to step-up said battery voltage when the battery voltage is less than a first predetermined value, and to permanently open said switch when the battery voltage is greater than the first predetermined value, which comprises the steps of:

controlling the step-up converter in the open loop, such that the step-up converter provides the intermediate voltage in dependence on the battery voltage; and regulating an output voltage by means of voltage regulation by the step-down converter.

\* \* \* \* \*